Sept. 23, 1924.

S. BARDY 1,509,628

COMBINED MAT AND BLENDING DEVICE

Filed June 5, 1922

WITNESS:
Rob.R.Kitchel.

INVENTOR
Samuel Bardy
BY
Frank L. Busser
ATTORNEY.

Sept. 23, 1924.
S. BARDY
1,509,628
COMBINED MAT AND BLENDING DEVICE.
Filed June 5, 1922  3 Sheets-Sheet 2
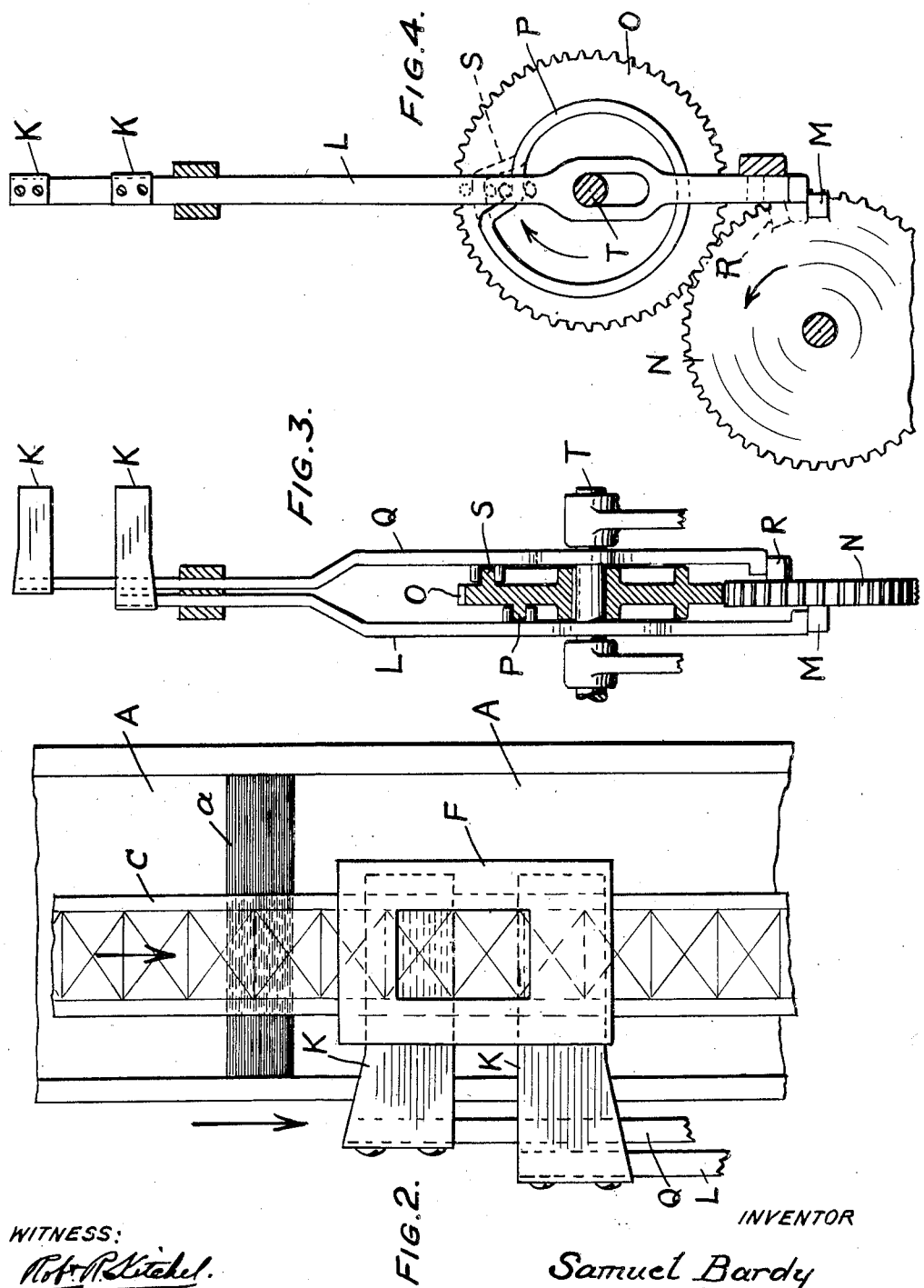
WITNESS:
INVENTOR
Samuel Bardy
BY
ATTORNEY.

Sept. 23, 1924.
S. BARDY
1,509,628
COMBINED MAT AND BLENDING DEVICE
Filed June 5, 1922  3 Sheets-Sheet 3
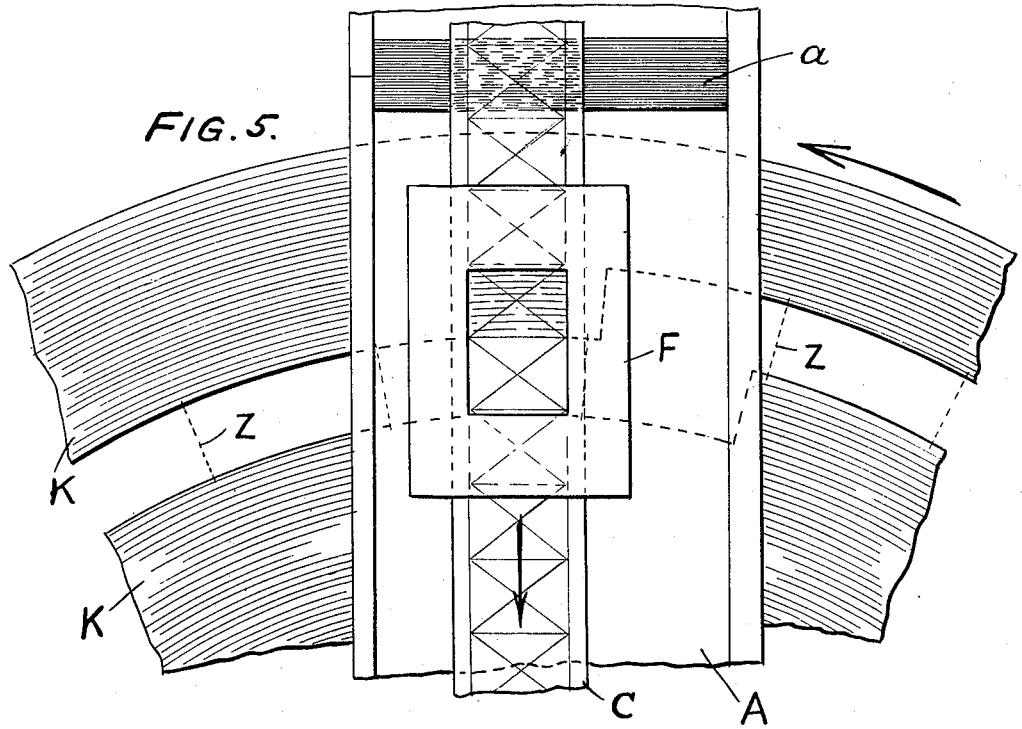
FIG. 5.
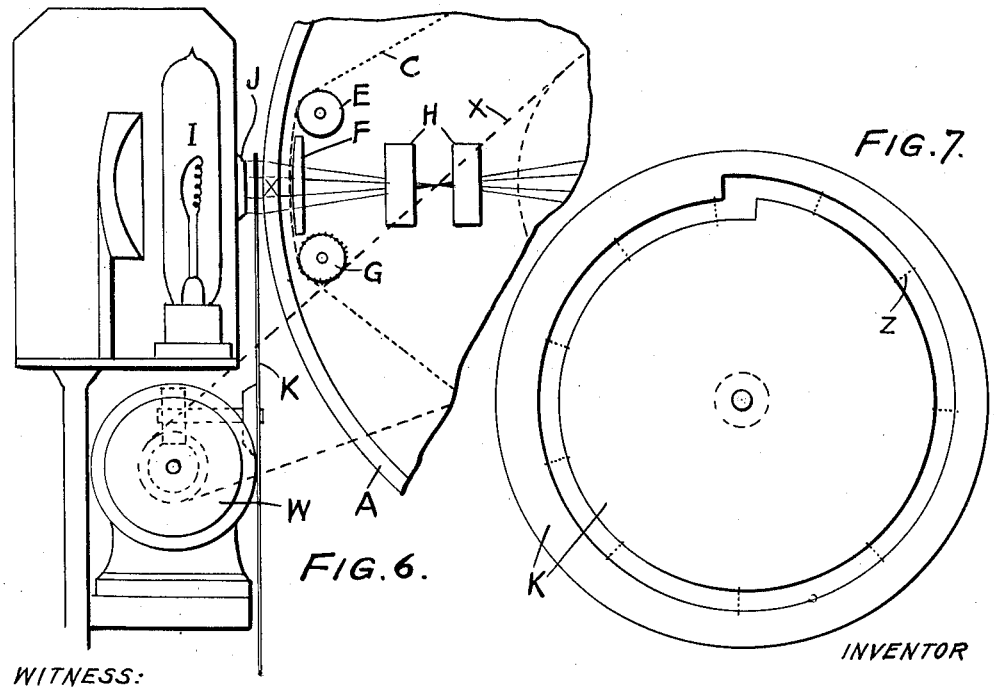
FIG. 6.
FIG. 7.
WITNESS:
INVENTOR
Samuel Bardy
BY
Frank L. Busser
ATTORNEY.

Patented Sept. 23, 1924.

1,509,628

UNITED STATES PATENT OFFICE.

SAMUEL BARDY, OF PHILADELPHIA, PENNSYLVANIA, ASSIGNOR TO BARDY MOTION PICTURE MACHINE COMPANY, OF PHILADELPHIA, PENNSYLVANIA, A CORPORATION OF DELAWARE.

COMBINED MAT AND BLENDING DEVICE.

Application filed June 5, 1922. Serial No. 566,173.

*To all whom it may concern:*

Be it known that I, SAMUEL BARDY, a citizen of the United States, residing at Philadelphia, county of Philadelphia and State of Pennsylvania, have invented a new and useful Improvement in Combined Mat and Blending Devices, of which the following is a full, clear, and exact description, reference being had to the accompanying drawings, which form a part of this specification.

This invention relates to an improvement in light beam controlling means for motion picture machines, and more particularly to light beam controlling means for machines in which the film is moved in a continuous manner such as shown in my Patent No. 1,313,669, of September 23, 1919, or my application Serial No. 450,575, filed March 8, 1921, and other copending applications.

My invention is applied to a machine in which the exposing field of the film is defined by an aperture plate having an opening of approximately the size of two pictures through which a beam of light is projected to the screen and which definitely limits or fixes the width of the said projected beam, while the height and horizontal position of the beam is controlled by a mat in such a manner that the beam is directed to a picture as it enters said field, travels with the picture across the field and is cut off from said picture after it has traversed the field.

At the time of transition from a picture just exhibited to the next successive picture to be exhibited, two full pictures are exposed by the aperture plate and the beam of light is permitted by the mat to cover both pictures for a short space of time relative to the time required for a picture to traverse the exposing field. This would intensify the image on the screen at the time of transition, as substantially double the amount of light would be directed to the screen were not some other means provided for reducing such light. In order to avoid this intensifying of the image at the time of transition which would be objectionable as it would momentarily intensify the image for each picture exposed and produce an exceedingly bright image at such time, I provide means, preferably on the compensating lens system to reduce the light at this time, so as to produce an image of substantially the same intensity throughout the travel of the film.

In the illustrated embodiment of this invention, I provide a constantly rotating optical compensating system of annular form having four separate lenses, each covering substantially 90° of the annulus, and within which annulus is mounted an objective lens system, film feeding mechanism, a mat and an aperture plate for the film. The film feeding mechanism is actuated in timed relation to the optical compensating system, so as to feed four pictures on the film to the exposing field of the aperture plate for each cycle of the optical compensating system. The aperture plate is placed adjacent to one side of the annulus formed by the compensating lenses and a suitable lamp or source of light is placed on the outside of the annulus in the same plane as the opening through the aperture plate and the objective lens system. The lamp or source of light and aperture plate are placed adjacent to the compensating lens annulus, but on opposite sides thereof.

The mat is arranged to expose only one picture during the major portion of the travel of the picture from the time it is fully exposed through the opening in the aperture plate until it is in the position when it starts to leave said opening and at which time the mat is arranged or so operated as to expose the two pictures in aperture plate opening, when the one picture is leaving the field of exposure and the next picture has just entered such field.

The various parts are so timed that when two full pictures are exposed in the opening of aperture plate, the junction between the rectifying lenses is in the beam of light passing through the two pictures and both pictures will be projected to the same position on the screen by the rectifying lenses. It, therefore, follows that as light is projected to the screen through two pictures, double the amount is thrown upon the screen at this time, or at the time of transition, from the picture just exposed to the next picture to be exposed.

In order to prevent such an intense light from passing to the screen, I darken a portion of the compensating lenses at the junction between lenses. The width of the darkened portion on these lenses is in direct proportion to the increase of light which would be directed to the screen if not obstructed, so that the intensity of the image on the screen is substantially equal at all times.

The precise nature of my invention will be best understood by reference to the accompanying drawings, which will now be described, it being premised, however, that various changes may be made in the details of construction and the arrangements of the parts without departing from the spirit and scope of my invention as defined in the appended claims.

Fig. 2 is a detail face view illustrating the cooperation between the film, aperture plate, mat and darkened portion for cutting down the light beam at the time of transition from one picture to the next.

Figs. 3 and 4 are detail sectional views illustrating the actuating mechanism for the mat shown in Figs. 1 and 2.

Fig. 5 is a view, similar to Fig. 2, illustrating a modified form of mat.

Fig. 6 is a view, similar to Fig. 1, showing means for operating the mat shown in Fig. 5.

Fig. 7 is a face view of the mat shown in Figs. 5 and 6.

Figure 1:
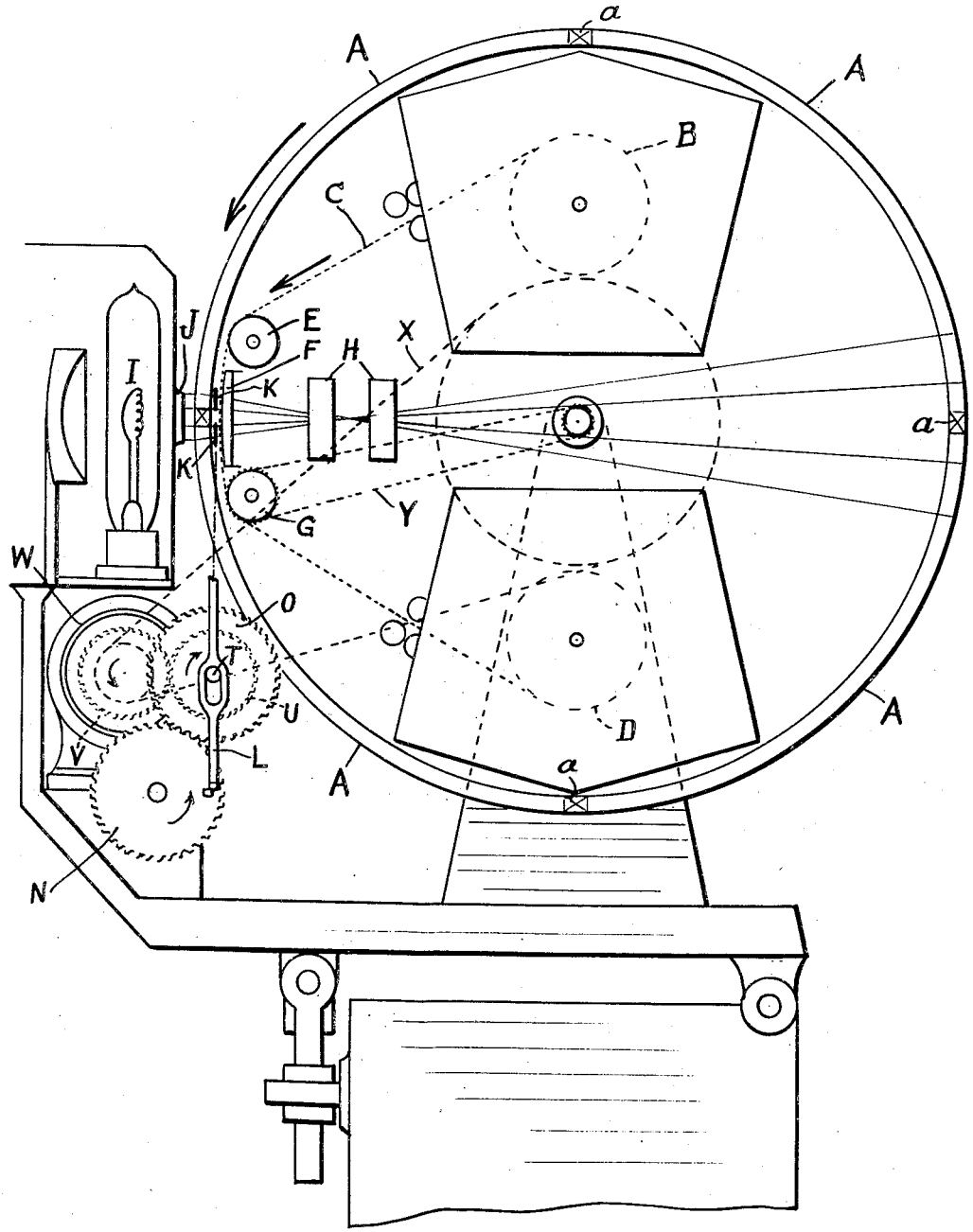
Fig. 1 is a side elevation view, somewhat diagrammatic, illustrating one form of my invention.

The apparatus illustrated in Fig. 1 is similar to that illustrated in my application Serial No. 566,172, filed June 5, 1922. In the drawings, A A designate four compensating lenses, each of which is of arcuate form and about ninety degrees in length, and when four such lenses are suitably mounted an annular structure is formed as shown. B is the feed reel from which the film C is fed to the take-up reel D. The film C in its passage from the reel B to the reel D passes over an idle roller E, an aperture plate F, and a feed sprocket G. These various members or elements are mounted within the annular compensating lens structure in such a manner that the film is moved over the aperture plate F adjacent to the inner faces of the lenses A, at one side of the annular lens structure. and the film is moved in the same direction as the lens structure at this side, while the opposite side thereof moves in the opposite direction to rectify the movement of the film. Located in the annular lens structure between the rectifying portion thereof and the aperture plate F is an objective lens system H. I is a source of light or lamp on the exterior of the annular lens structure, and J is a condenser in front of the lamp. Interposed between the aperture plate F and the annular lens structure is a mat or light ray controlling device having upper and lower blades K K. These blades K K are arranged to be raised and lowered independent of each other by mechanism hereinafter described in timed relation to the film and rectifying lenses to follow the successive pictures on the film across the opening in the aperture plate F.

The width of the opening in the aperture plate F is the same as the width of the pictures on the film C, while the height thereof is equal to the height of two pictures, see Fig. 2.

The plates K K are normally spaced from each other a distance equal to the height of the beam of light passing through a single picture on the film. The pictures are framed or shifted into timed relation to the rectifying lenses and the mat so that the mat will follow the film in such a manner as to only permit light to pass through one picture from the time the picture to be exposed has moved over the opening in the aperture plate and until it has passed across said opening and is about to pass beyond said opening.

Just prior to the time that two pictures are in the plane of the opening in aperture plate F or after the film C has moved slightly beyond the position shown in Fig. 2, the upper plate K will be rapidly elevated to uncover the picture now covered thereby which will occur at the time the upper edge of the picture covered thereby reaches the upper edge of the opening in aperture plate F. At this time two pictures will be exposed by the aperture plate and mat and immediately after the upper plate K has been shifted to uncover the next picture, the lower plate K will be raised to cover the picture just exposed, and both plates K will now move down with the film until the next picture moves into the plane of the opening in the aperture plate K when the plates K K will again be quickly raised to follow the next picture. The above movement of the plates K K of the mat is repeated for each picture. The parts are so timed that the darkened portion *a* between lenses A A passes the opening in aperture plate F at the time two pictures are exposed to reduce the light at such time.

The plates K K are reciprocated by their supporting rods, which are guided in suitable guides on the machine. The rods are each elevated by their own cams which elevate them very rapidly, and each is lowered by another cam at a speed relatively slow when compared with the elevating speed.

The lower plate K is connected to a rod L, the lower end of which is engaged by a cam projection M on a gear N and which is arranged to engage and lift the rod L each revolution. The gear N meshes with a gear O having a cam P thereon which is engaged by pins on rod L. The gears N and O are of the same diameter, while the cams M and P are so set relative to each other and the portions on rod L engaged thereby that for each revolution of the gears the plate K is rapidly raised by cam M and lowered slowly by cam P. The upper plate is similarly supported and actuated by a rod Q, which is actuated by cams R and S, similar to cams M and P on the respective gears N and O. The cams R and S are slightly in advance of cams N and P to raise the upper plate K in advance of the lower plate, as above described.

The gear O is secured to a shaft T to which is secured a gear U, which meshes with a gear V on the shaft of a driving motor W. The motor is geared to the support for lenses A A by a link belt X, and Y is a link belt on a sprocket wheel on the shaft of sprocket wheel G and a similar sprocket wheel on the shaft of the lens support.

The gearing is such that all parts are actuated in timed relation to move four pictures on the film C past the aperture plate F for each cycle of the lens support, and to actuate the plates K K of the mat for each picture as it passes over the aperture plate F.

In the form shown in Figs. 5-7, I have illustrated a rotary mat having a spiral groove between inner and outer or upper and lower plates K K, which are connected to each other by wires Z. The mat in this form is placed between the lamp I and lenses A, see Fig. 6, and is geared to the motor to make one revolution for each picture moved past the aperture plate F. The groove between plates K K is spiral so as to follow the successive pictures across the aperture plate F and is widened at the ends of the spiral to expose two pictures, at the time when one picture is leaving the field of exposure and the next has entered said field.

The advantages of my invention result from the provision of means for controlling the light rays in a moving picture machine in which the film and a compensating system are moved in a continuous manner, and which is arranged to direct the beam of light for the successive pictures and maintain said beam in the path of the picture section during its movement across the field of exposure and enlarge said beam to cover two pictures when the previously exposed picture section is leaving said field and the next section has entered the field and is about to pass across said field, together with means for obstructing a portion of or reducing the light beam at the point of transition from one picture to the next, or at the time the beam is directed through two pictures.

Having now fully described my invention, what I claim and desire to protect by Letters Patent is:

1. A motion picture machine comprising means for feeding a film with picture sections thereon, across a field of exposure in a continuous manner, an optical rectifying system connected to the means for feeding the film, a mat having an opening therethrough for exposing a single picture or two adjacent picture sections, and mat actuating devices connected in timed relation to the means for feeding the film and the rectifying system to actuate the mat to cause the opening therein to follow and expose only one picture section during the major portion of its travel across the field of exposure and to expose two pictures at the time the previously exposed picture is passing out of the field of exposure and the next picture to be exposed has passed into the field of exposure, and to then cause the opening to expose only the last mentioned picture and follow it across the field of exposure.

2. A mat for motion picture machines in which the film is moved in a continuous manner to cause successive pictures to be moved across a field of exposure, the mat having two plates with a picture exposing opening between the adjacent edges of the two plates, and means for reciprocating said plates in timed relation to each other and the film to cause the mat to be reciprocated once for each picture moved across the field of exposure, the reciprocating means for the plates being arranged to cause the plates when moved in one direction to move in unison with each other and the film to expose one picture as it moves across the field of exposure and to relatively quickly move the plates in the reverse direction in a successive manner to first enlarge the opening to momentarily expose two pictures and then reduce the opening to expose one picture preparatory to the next movement of the plates in unison in the prior named direction.

3. A mat for a motion picture machine comprising separate plates with an exposing opening between the adjacent edges of the plates, and a separate cam mechanism for reciprocating each plate, the cam mechanisms being arranged to move the plates relatively slowly on their forward movement and rapidly on their return movement and to cause the plates to move in unison during substantially their entire forward movement and to successively move the plates on their return movement.

4. A mat for a motion picture machine comprising separate plates with an exposing opening between the adjacent edges of the plates, a rod connected to each plate, guides for the rods, a cam wheel, a lift cam on the cam wheel for each rod, the one cam being slightly in advance of the other, a second cam wheel, gear connections between said cam wheels, and a cam on the second wheel for each rod arranged to permit the rods to fall slowly relatively to their lifting movement and to permit the rods to fall in unison during substantially their entire downward movement.

5. A projecting machine having means for continuously feeding a film having picture sections thereon, an optical rectifying system connected to the film feeding mechanism, an objective lens system, a source of light, a mat connected in timed relation to the film feeding means and the optical rectifying system, said mat being arranged to direct a beam of light to each successive picture section as they move across a predetermined field of exposure and to direct said beam to two adjacent picture sections when in said field, and other means for obstructing a portion of said beam of light when it is directed to two picture sections.

6. The method of projecting motion pictures comprising the steps of moving a film having successive pictures thereon in a successive manner across an exposing field and projecting a beam of light through the film, an objective lens system and a continuously moving optical rectifying system to move the beams of light passing through the successive pictures in the reverse manner from that caused by the movement of the film to produce a stationary image on the screen, controlling the beam of light passing to the film from the source of light so as to only cover one picture during its travel across the field of exposure and to direct said beam through two pictures at the point of transition from the previously exposed picture to the next picture to be exposed and reducing said beam of light during the transition period to produce an image of the same intensity at the time of transition as at the time during which the beam is only passing through one picture.

In testimony of which invention, I have hereunto set my hand, at Philadelphia, Pa., on this 13th day of May, 1922.

SAMUEL BARDY.